United States Patent [19]

Nelson

[11] 4,328,789
[45] May 11, 1982

[54] SOLAR TRACKING DRIVE MECHANISM

[75] Inventor: David H. Nelson, Arroyo Grande, Calif.

[73] Assignee: American Solar, Arroyo Grande, Calif.

[21] Appl. No.: 78,464

[22] Filed: Sep. 24, 1979

Related U.S. Application Data

[63] Continuation-in-part of Ser. No. 934,847, Aug. 18, 1978, abandoned, which is a continuation of Ser. No. 744,290, Nov. 2, 1976, Pat. No. 4,108,154.

[51] Int. Cl.³ .............................................. F24J 3/02
[52] U.S. Cl. ................................... 126/425; 250/491; 353/3
[58] Field of Search ....................... 126/424, 425, 417; 250/491, 203 R; 248/397; 353/3; 92/10; 188/269

[56] References Cited

U.S. PATENT DOCUMENTS

| 495,163 | 4/1893 | Severy | 126/425 |
|---|---|---|---|
| 2,712,772 | 7/1955 | Trombe | 126/425 |
| 3,070,643 | 12/1962 | Toulmin | 126/425 |
| 3,171,403 | 3/1965 | Drescher | 126/425 |
| 4,038,972 | 8/1977 | Orrison | 126/425 |
| 4,044,752 | 8/1977 | Barak | 126/425 |
| 4,063,543 | 12/1977 | Hedger | 126/425 |
| 4,158,356 | 6/1979 | Wininger | 126/425 |
| 4,178,913 | 12/1979 | Hutchison | 126/424 |
| 4,185,615 | 1/1980 | Bottum | 126/424 |
| 4,187,123 | 2/1980 | Diggs | 126/425 |

FOREIGN PATENT DOCUMENTS 2715334 10/1978 Fed. Rep. of Germany ...... 126/425

Primary Examiner—Daniel J. O'Connor
Attorney, Agent, or Firm—Fulwider, Patton, Rieber, Lee & Utecht

[57] ABSTRACT

A solar tracking mechanism is used to orient a solar collector to directly face the rays of the sun using a hydraulic actuator and gear motor to both adjust the orientation of the collector and to stabilize it against spurious movement. One or more hydraulic cylinders are connected to act through at least one crank pin to rotate the collector about an axis. Hydraulic fluid is transfered between chambers in the cylinders by means of a low power gear motor. The collector itself is constructed without perforations through an insulating shell, but instead mounting brackets are molded into the shell and are configured to faciliate mounting of the collector.

2 Claims, 7 Drawing Figures

SOLAR TRACKING DRIVE MECHANISM

BACKGROUND OF THE INVENTION

The present application is a continuation-in-part of U.S. application Ser. No. 934,847, filed Aug. 18, 1978, now abandoned which is a continuation of U.S. patent application Ser. No. 744,290 filed Nov. 2, 1976, now U.S. Pat. No. 4,108,154.

The present invention relates to tracking drive mechanisms for solar energy collectors, and to a collector construction which minimizes heat loss from within.

DESCRIPTION OF THE PRIOR ART

Various solar collector drive mechanisms have been devised to attempt to orient solar collectors directly toward the rays of the sun, yet not inordinately consume power in their operation. Historically, such drive mechanisms have consumed excessive power through operation of electric motors, and the like, which have been forced to move the weight of a collector in rotation, and to maintain its orientation against undesired rotational influences. Such influences are frequently present from the blowing of the wind.

In prior art systems the desirability of maintaining a collector in proper orientation relative to the position of the sun overhead has been recognized. Proper orientation should be maintained in accordance with the latitude location of the solar energy collection device on the earth's surface and in accordance with the azimuth of the sun in the sky. Even more important, however, is the proper orientation of the collector device in accordance with the relative movement of the sun from east to west with respect to the earth's surface. All conventional systems heretofore, however, have been significantly defficient in one or more respects.

In those system where manual orientation is suggested, The practical effect is that the reflector is seldom properly aligned since the lapse of a view moments between adjustments results in a marked decrease in efficiency of energy collection. The electro-mechanical systems heretofore employed have maintained proper orientation, but only with an inordinate consumption of energy in the process. For example, one-half and three quarter horsepower motors have been employed to rotate solar collection devices of conventional systems. The amount of energy to effect this rotation detracts significantly from the net energy output achieved using conventional solar energy systems of this type.

One device which has met with success in preventing disorientation of a solar collector due to gusts of wind is described in U.S. Pat. No. 4,108,154. This system involves a hydraulic shock absorber which dampens the movement of a solar collector against spurious rotational influences. However, the device described in the aforesaid patent also requires a separate tracking mechanism which is utilized to orient the collector directly toward the rays of the sun. This system has the disadvantage in that the drive mechanism must overcome the natural damping effect of the hydraulic shock absorber, as well as shift the weight acting upon the collector.

SUMMARY OF THE INVENTION

A principal object of the present invention is to significantly reduce the energy consumption required to maintain proper collector orientation. A further object of the invention is to provide a means for maintaining proper orientation of the collector by preventing wind and wind gusts from disorienting the alignment of the collector panel. This is achieved by the use of one or more hydraulic cylinders connected between the collector and its support. The hydraulic cylinders serve as shock absorbers to allow the collector to rotate slowly to track the sun but prevent sudden reorientation which would otherwise result from wind gusts. Hydraulic fluid is transferred between the sections of the hydraulic cylinders in a fluid loop to reposition the pistons therewithin and to thereby alter the collector orientation.

In the present invention a solar tracking drive mechanism is employed in which a hydraulic damping mechanism is itself utilized as the tracking element. That is, a piston in a hydraulic cylinder is moved under the pressure of hydraulic fluid transferred under the influence of a hydraulic gear motor. The gear motor employs a pair of oppositely rotating gears situated in a hydraulic fluid line. The gears are rotated to carry hydraulic fluid between their teeth in one direction or the other. Hydraulic fluid is prevented from passing in the opposite direction around the gears by means of close fitting baffles or seals which limit the flow of the hydraulic fluid to the direction imparted by the interacting teeth of the gear motor device.

A hydraulic cylinder may be connected to a crank pin on the solar collector which is offset from the axis of rotation thereof. Fluid is transferred between the separate chambers in the cylinder using a reservoir chamber to compensate for volume differences attributable to the volume of the piston rod in one chamber and not the other. Alternatively, a pair of hydraulic cylinders may act through a pair of crank pins offset on either side of the collector axis. The blind ends of the hydraulic cylinders are connected together by a hydraulic fluid line, as are the ends thereof surrounding the piston rods which extend outwardly from the barrels of the hydraulic cylinders. The gear motor is situated in one of these interconnecting hydraulic lines to thereby force the piston rods to extend, or to retract them in order to rotate the solar collector to direct orientation facing the sun.

Another feature of the invention involves the use of an electric solenoid to control the flow of hydraulic fluid around the gear motor drive to and from a reservoir in order to maintain coordinated movement of a plurality of the hydraulic cylinder pistons and to prevent the cylinders from locking up. Similarly, an electric solenoid is used to control fluid flow to and from a hydraulic reservoir to compensate for the volumetric difference that arises from the changing displacement of the piston rod as the piston rod moves into and out of the end of a single cylinder surrounding it.

Yet a further feature of the invention involves the actual construction of the collector itself, which minimizes the loss of heat therefrom, yet allows the collector to be easily mounted for rotation upon an axis. In this connection, internal mounting ribs are defined in the concave floor of a shallow fiberglass tray in order to support a network of tubing through which a thermal collection fluid flows. This eliminates the requirement for holes to be drilled in the insulating shell and for metal fasteners to be mounted therein. Such metal fasteners are a continual source of heat loss in conventional collector devices.

A further feature of the collector of the invention is the use of a pair of mating mounting brackets which are configured both to receive or provide axles for rotating the collectors about a central longitudinal axis, and to receive or provide crank pins to which the hydraulic cylinders of the invention are connected. These mounting brackets are metal brackets, but are not attached to the insulating shell by means of through-wall fittings, as are conventional mounting brackets. Rather, the mounting brackets of the invention are molded into the fiberglass shell so as not to contact the interior. They are thereby locked in place, but do not extend to the interior of the shell, and so do not provide any source for conductive heat loss.

The invention may be described with greater clarity and particularly by reference to the accompanying drawings.

DESCRIPTION OF THE EMBODIMENT

Figure 1:
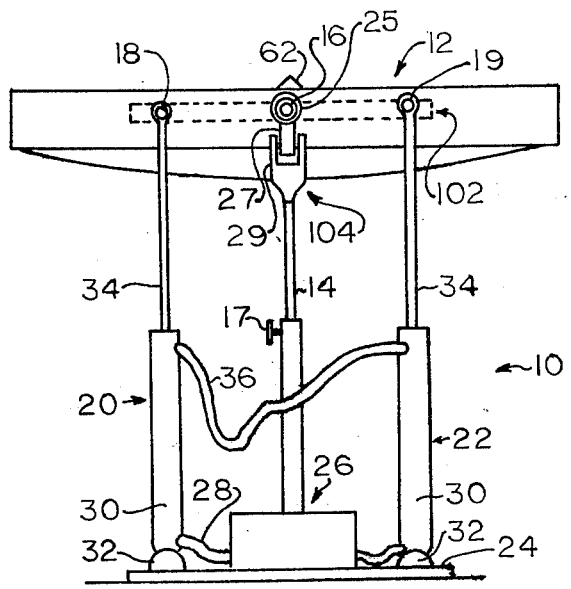
FIG. 1 is an end elevational view showing the collector and hydraulic tracking drive mechanism according to the present invention using a pair of hydraulic cylinders.

FIG. 1 illustrates a solar energy collecting system 10 in which an elongated, generally rectangular, flat plate solar collector 12, constructed in generally rectangular form and of uniform cross section, is mounted upon a base 24 at either end by elongated upright rod-like supports 14 for rotation about central, aligned longitudinal axles 16 at either end. The flat plate collector 12 is rotated about a generally north-south axis by means of crank pins 18 and 19, laterally offset from the axles 16. A pair of hydraulic cylinders 20 and 22 are connected between the flat plate collector 12 at the crank pins 18 and 19 and the rectangular base 24, not only to inhibit spurious rotation of the flat plate collector 12 about the axles 16, but also to serve as part of the drive mechanism. The actuating member of the collector drive mechanism is housed in a control box 26 located on the base 24 between the hydraulic cylinders 20 and 22 through which a hydraulic fluid line 28 passes to interconnect the blind ends 30 of the cylinder barrels of the hydraulic cylinders 20 and 22.

Each of the supports 14 is coupled to an associated axle 16 of the collector 12 through a universal joint indicated at 104. This allows the supports 14 to accomodate relative changes in elevations of the collector ends. Atop each support 14, a bearing race 25 is welded to an upright arm 27 which is gimbaled in a yoke 29 that in turn is coaxially mounted for rotation relative to the support 14 to form the universal joint 104. The axles 16 are externally threaded at their ends for connection to the collector 12. One or both of the axles 16 may be hollow annular couplings to provide entry and egress of the heat collecting fluid flowing within the collector panel 12. The axles 16 are carried held in position in a bearing in the universal joint 104 by the bearing races 25. The upright supports 14 at either end of the collector 12 are adjustable in length to vary the longitudinal orientation of the collector 12 relative to the surface of the earth. That is, the supports 14 each include telescoping sections that may be secured to each other at different elevations by locking pins 17.

The hydraulic cylinders 20 and 22 are connected to the base 24, which rests flat upon the surface of the earth by means of hinged yoke-like connection brackets indicated at 32. Each of the hydraulic cylinders 20 and 22 includes a piston rod 34 that terminates in a piston within an annular cylindrical barrel 30. The piston divides the barrel 30 into two chambers, both containing hydraulic fluid. The hydraulic cylinders 20 and 22 thereby serve as shock absorbers. Sudden gusts of wind from the east or west will be met by substantial resistance provided by the shock absorbers or hydraulic cylinders 20 and 22. Such wind gusts are extremely common in desert areas where solar energy collection devices, such as the device 10, find a great utility. However, operation of a gear motor within the control box 26 to rotate the collector 12 is not inhibited by the hydraulic cylinders 20 and 22 because of the fluid circulation loop provided by the interconnecting fluid line 28 that connects the blind ends of the barrels 30 of the hydraulic cylinders 20 and 22 and by the hydraulic line 36 that connects the ends of the barrels 30 that surround the piston rods 34. The piston rods 34 are connected at their upper extremities to the crank pins 18 and 19, displaced from the axle 16 of the collector 12.

Figure 2:
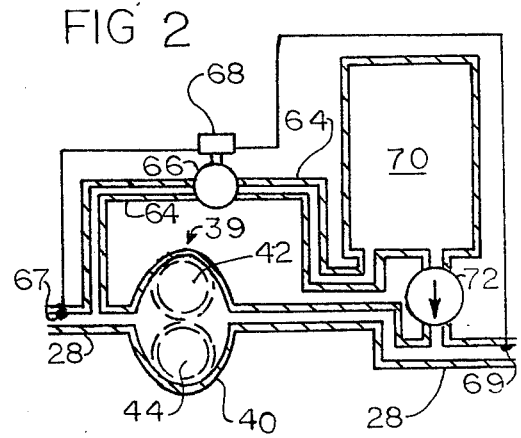
FIG. 2 is a sectional detail of the gear motor and bypass line of the invention.

The interconnection of the blind ends of the hydraulic cylinder barrels 30 and the actuating portion of the tracking drive mechanism are illustrated in detail in FIG. 2. A metal gear motor casing 40 is located in the hydraulic line 28 in the control box 26. The casing 40 contains a gear motor 39 that includes a pair of adjacent, interacting gears 42 and 44 which rotate together, one clockwise and one counterclockwise. The directions of rotation of the gears 42 and 44 can be reversed by means of the reversible d.c. motor 46, illustrated in FIG. 3. The drive shaft of the motor 46 is connected to interacting spur gears 50 and 52, from which shafts 54 and 56 pass laterally through the wall of the casing 40 in fluid tight sealed arrangement to rotate the gears 42 and 44 of the gear motor drive. The shaft 48 can be rotated in either direction, and in one direction of rotation will rotate the gear 42 clockwise and the gear 44 counterclockwise, as viewed in FIG. 2, to force hydraulic fluid between the interactive teeth of the gears 42 and 44 toward the left to the blind end of the barrel 30 of the hydraulic cylinder 20. Movement of hydraulic fluid in this direction forces the piston rod 34 of the hydraulic cylinder 20 upward, thereby rotating the flat plate collector 12 in a clockwise direction, as viewed in FIG. 1. The same motion forces hydraulic fluid through the connection line 36 and into the end of the barrel 30 of the hydraulic cylinder 22 which surrounds the piston rod 34 extending therefrom. This forces the piston in the hydraulic cylinder 22 deeper into the blind end of the barrel 30, thereby forcing the piston rod 34 thereof downward and drawing the right hand side of the collector 12 downward in a clockwise manner of rotation. As the piston in the hydraulic cylinder 22 travels downward, fluid is supplied to the gear motor 39 of FIG. 2 from the right, as viewed in FIG. 2. The drive motor 46 may be driven in the opposite direction to reverse the direction of rotation of the collector 12.

The drive motor 46 may be a small 1/25th horsepower d.c. motor, even for a flatplate collector 12 which is five feet wide and ten feet long. The mechanical advantage achieved with the use of hydraulic fluid to drive the hydraulic cylinders 20 and 22 allows such a small motor to control the rotation of a very large collector 12, and even a bank of as many as twenty collectors, connected for tandem rotation.

Figure 3:
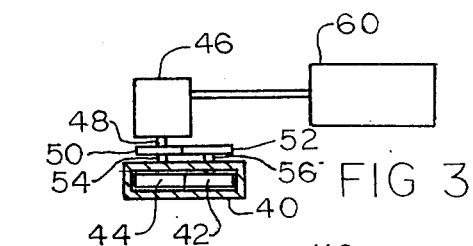
FIG. 3 is a top elevational view, partially in block form, showing the hydraulic drive control of FIG. 2.
Figure 6:
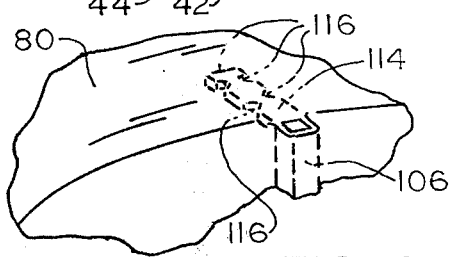
FIG. 6 is a detail of the collector in inverted position illustrating the manner of attachment of the mounting bracket of FIG. 5.

The electric motor 46 is actuated in either of two opposite directions by means of a photosensor control indicated generally at 60 in FIG. 3 and including a sensor element 62, illustrated in FIG. 1. The sensor element 62 includes opposing photosensitive faces arranged in a triangular shape on the surface of the edge of the collector 12 with one face slanted toward the east and the other toward the west, as illustrated in FIG. 1. Each face of the sensor element 62 includes a photosensitive diode, matched with the other. Electrical outputs of the photosensitive diodes are compared in conventional analog logic circuity and the differential of outputs is used to actuate the motor 46 to maintain the face of the collector 12 oriented perpendicular to the incident rays of the sun. A very suitable sensing system and motor actuating arrangement is described in U.S. Pat. No. 4,223,214, issued Sept. 16, 1980.

The motor 46 is reversible, so that than an output from the photosensitive diode on the west facing side of the sensor element 62 greater than from the east facing photosensitive diode will cause the motor 46 to turn the gears 42 and 44 to drive hydraulic fluid in the line 28 from left to right, as viewed in FIG. 2. Dominance of the output from the east facing photosensitive element will cause the motor 46 to rotate in the opposite direction, thereby rotating the gears 42 and 44 of the gear motor 39 in the opposite direction and forcing hydraulic fluid from right to left, as viewed in FIG. 2.

The hydraulic line 28 also includes a by-pass network as depicted in FIG. 2. A by-pass tube 64 intersects hydraulic fluid line 28 to the left of the gear motor 39 and is directed to a solenoid actuated valve 66. A electrical solenoid 68 is employed to actuate the valve 66. The by-pass line 64 continues to the right and leads to a hydraulic fluid reservoir tank 70. In addition to the outlet to the by-pass line 64, the tank 70 also has an outlet leading to a one-way check valve 72, which allows fluid to flow downward to an intersection with the hydraulic line 28 to the right of the gear motor 39.

In the operation of the invention, a signal from the sensing element 62 in the photosensor control 60 directs the motor 46 to rotate in one of two opposite directions whenever the flat plate collector 12 does not directly face the rays of the sun. If FIG. 1 is considered a view from the south, the progress of the sun across the sky will periodically cause the motor 46 to rotate the gears 42 and 44 to drive fluid to the right and toward the blind end of the barrel 30 in the hydraulic cylinder 22.

If, due to unequal thermal effects on the hydraulic fluid, nonuniformity of the hydraulic cylinder bores or displacement, or for any other reason a pressure differential exists in the hydraulic cylinders 22 and 24, an unequal electrical signal is dispatched by pressure sensors 67 and 69 to the solenoid 68 to open the valve 66. This allows excess fluid in the hydraulic cylinder 20 to flow into the reservoir 70. This prevents the system from locking up should a pressure imbalance exist.

On the other hand, at the end of the day when the electric motor 46 is reversed to drive the collector toward an eastward facing position, hydraulic fluid can drain back into the system from a reservoir 70 through the check valve 72. Should the pressure differential exist in the opposite direction, excess fluid is driven by the gears 42 and 44 not only toward the blind end of the barrel 30 in the hydraulic cylinder 20 through the line 28, but rather is partially recirculated through the solenoid actuated valve 66 into the reservoir 70.

It should be understood that the electrical solenoid 68 will only be activated when the drive motor 46 is on. This prevents spurious gusts of wind from creating a pressure imbalance in the system.

Figure 4:
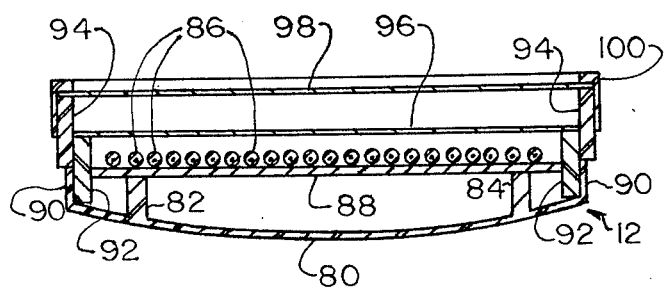
FIG. 4 is a sectional view showing the interior construction of the collector of the invention.

The collector 12 itself has a very unique, efficient construction. The details of construction of the collector 12 are depicted in FIG. 4. As illustrated, the collector 12 has a shallow fiberglass tray 80 formed with a concave bottom from which longitudinally extending risers or mounting ribs 82 and 84 arise. The concave bottom of the shell 80 is both easy to lay up on a mold, and also provides the collector with superior physical strength. The ribs 82 and 84 likewise add to the strength of the structure.

The heat collection fluid which flows within the flat plate collector 12 travels through a network of copper conduits indicated at 86, which are located upon a planar backing in the form of a plastic, fiberglass or metallic sheet 88. The planar backing sheet 88 rests upon the upright ribs 82 and 84 of the shell 80.

In an alternative construction several header type conduits are utilized. These conduits are made from a series of individual plates. A series of pairs of plates are welded together along transverse lines to define tunnels or flow passageways from an inlet header to an outlet header. The top plate is deformed to define the tunnels between the facing plates. A common header is used on the supply side and a separate common header at the outlet side. Outlet flow is controlled with orifices or flow valves to the outlet header.

The lateral edges 90 of the collector 12 turn upwardly and laterally confine elongated polyurethane or styrofoam foam insulation strips 92 therewithin. The foam strips 92 are located between the lateral edges of the backing sheet 88 for the tubing 86 and the outer edges or rims 90 of the collector 12.

Similar foam strips 94 are located upwardly and outwardly from each of the longitudinally extending strips 92 and provide further thermal insulation. An inner ultraviolet transparent, infrared barrier, thin laminar sheet of glazing 96, constructed of teflon or glass, is located directly above the conduit 86. The edges of the laminer sheet 96 rest atop the inner foam strips 92 and abut against the outer foam strips 94. An outer, second glazing sheet 98 of glass, fiberglass, acrylic or lexan is positioned atop the outer foam strips 94. The second sheet 98 is likewise transparent to ultraviolet radiation, and serves to insulate in the infrared region. The edges of the outer glazing sheet 98 are entrapped by a plastic collar 100 which extends about the upper perimeter of the flat plate collector 12. The outer glazing 98 not only serves to entrap heat therebeneath, and thereby maximize temperature in the fluid flowing in the conduits 86, but also serves to prevent dust, sand, snow or other debris from degrading the interior of the collector 12.

A pair of mating mounting brackets 102 are molded into the structure of the fiberglass shell 80 during its construction. The mounting brackets 102 are located at either end of the collector 12 and are adapted to receive mounting axles 16, by means of which the collector panel 12 is mounted in the the universal joints 104 atop the upright supports 14 at both ends of the collector 12.

Figure 5:
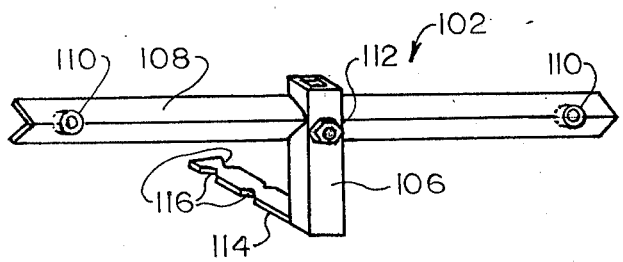
FIG. 5 is a detail showing a mounting bracket according to the invention in perspective.

The mounting brackets 102 are formed with 1¼ by 1¼ by ⅛ inch square steel tubes, indicated at 106 in FIG. 5. Near the upper ends of the hollow square tubes 106, triangular shaped notches are cut to receive lengths of a 1¼ by 1¼ by ⅛ inch L-shaped iron 108. Near either end of the angle iron 108 there are outwardly directed sockets 110 which are interiorally threaded and adapted to receive the stud-like crank pins 18 and 19. Similarly, near the upper extremity of each square steel tube 106 an interiorally threaded aperture is defined to receive mounting axles 16. The aperture in the steel tube 106 is plugged with a threaded bolt 112 during construction of the fiberglass shell 80, as are the sockets 110. This prevents fiberglass or resin from becoming enmeshed in the threads therein.

The bottom of each hollow square steel tube 106 has a rearwardly directed flange 114 welded thereto. The flange 114 is notched at 116 in several places on either side. These notches enhance the degree to which the flanges 114 are locked into the fiberglass structure of the shell 80 when the fiberglass is laid up on the mold. During the laying up process, the mounting brackets 102 are positioned in abutment at either end of the shell 80 and fiberglass is laid over the flange 114 and the square steel tubes 106 are pressed into the resin of the fiberglass to secure the mounting brackets 102 firmly at either end of the shell 80. Then the exposed steel tubes 106 are covered over with additional resin impregnated fiberglass to bury the structure of the brackets 102 within the shell 80, with only the sockets 110 and the threaded bolts 112 exposed. The fiberglass is then cut away to expose the lower ends of the steel tubes 106 adjacent the flanges 114. The square apertures in the steel tubes 106 allow extension arms to be telescopically inserted into the lower ends of the tubes 106 so that a number of collectors 12 may be coupled together and rotated in tandem by a single motor 46.

By using the mounting brackets 102 and the ribs 82 and 84, all through-wall fittings into the structure of the shell 80 are eliminated. This reduces heat loss considerably which otherwise occurs through conduction from the interior of a collector through the metal fittings to the ambient atmosphere beyond.

Figure 7:
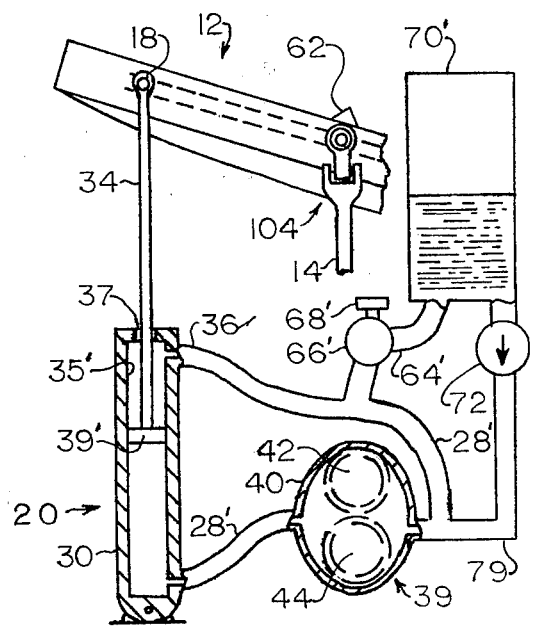
FIG. 7 illustrates an alternative embodiment of the invention employing only a single hydraulic cylinder.

An alternative embodiment of the hydrualic tracking drive mechanism is depicted in FIG. 7. A collector 12 is supported upon rod-like supports 14 in the manner described in association with the embodiment of FIGS. 1-3. However, only a single hydraulic cylinder 20 is provided and is coupled to a single one of the sockets 110 by a crank pin 18. The gear motor 39 is of the same type as illustrated in FIG. 2, but the hydraulic line 28' is not connected to another hydraulic cylinder, but rather is connected directly to the hydraulic fluid line 36'. A bypass line 64' leads to a reservoir 70' and is connected in a three way intersection to the hydraulic fluid lines 28' and 36'. The hydraulic fluid line 36' is connected to the cylinder chamber 35' of the hydraulic cylinder 20 which surrounds the piston rod 34. A fluid tight annular seal 37 ensures integrity of the structure of the hydraulic cylinder 20. The piston rod 34 moves reciprocally within the cylinder 20 in response to movement of the piston 39', and the volume of the portion of the piston rod 34 which resides within the chamber 35' of the hydraulic cylinder 20 varies accordingly.

A check valve 72 is located in an extension line 79 which leads from the hydraulic fluid line 28' to the reservoir 70'. The check valve 72 allows fluid to flow from the reservoir 70' into the hydraulic fluid line 28', but prevents fluid movement in the opposite direction.

In the operation of the embodiment of FIG. 7, the progress of the sun across the daytime sky, considering the device as viewed from the south in FIG. 7, will actuate the sensing element 62 to tend to operate the motor 46 to drive the gear 42 counterclockwise and the gear 44 clockwise. This action tends to draw hydraulic fluid from the blind end 30 of the hydraulic cylinder 20 and force it through the hydraulic fluid lines 28' and 36' to the opposite chamber 35' surrounding the piston rod 34. However, because a greater length of the piston rod 34 thereby extends into the chamber 35', a hydraulic fluid displacement is created which prevents all of the fluid displaced from the blind end 30 from being transferred to the opposite chamber 35'. Therefore, a signal to the electric motor 46 to drive gears 42 and 44 counterclockwise and clockwise respectively, also actuates the solenoid 68' to open the valve 66'. This allows the excess hydraulic fluid being withdrawn from the blind end 30 of the hydraulic cylinder 20 to be transferred through the bypass line 64' to the reservoir 70'. The piston rod 34 is thereby able to reciprocate within the hydraulic cylinder 20 despite the differential in displacement as between fluid withdrawn from the blind end 30 and the volume of the opposite chamber 35' available for occupancy by hydraulic fluid.

By the same token, no signal is supplied to the normally closed solenoid actuated valve 66' when operation of the motor 46 is in the opposite direction. In such a situation, rotation of the collector 12 will be clockwise, as occurs in respositioning the collector 12 from a west facing position to an east facing position at the end of a solar day. The motor 46 drives the gear 42 clockwise and the gear 44 counterclockwise. This withdraws hydraulic fluid from the chamber 35' through the hydraulic fluid line 36' and transfers it to the blind end 30 of the hydraulic cylinder 20 through the hydraulic fluid line 28'. However, because the volume of hydraulic fluid withdrawn from the chamber 35' is smaller than the corresponding volume available for occupancy by hydraulic fluid within the blind end of the hydraulic cylinder 20, additional hydraulic fluid is withdrawn from the reservoir 70' through the one way check valve 72'. In this manner the hydraulic cylinder 20 will not lock up due to the volume differential that exists as a result of the space within the chamber 35' occupied by the piston rod 34.

Undoubtedly, numerous modifications and variations of the invention will become readily apparent to those familiar with solar energy collection devices. Accordingly, the scope of the invention should not be construed as limited to the specific embodiment depicted herein, but rather is defined in the claims appended hereto.

I claim:

1. In a solar energy collection system in which a solar energy absorbing structure is rotated about a longitudinal axis mounted upon a support under the control of a drive mechanism to face the sun, the improvement comprising damping means including:

a hydraulic cylinder having a barrel, a piston reciprocal within said barrel and dividing said barrel into two chambers, a piston rod connected to said piston and extending from said barrel through one of said chambers for effectuating rotation of said solar energy absorbing structure, said drive mechanism including gear motor and hydraulic fluid transfer lines connected from said gear motor to opposite ends of said hydraulic cylinder to said chambers on opposite sides of said piston, further characterized in that said damping means is comprised of a single hydraulic cylinder having a barrel, and one of said barrel and piston rod is connected to said support and the other of said barrel and piston rod is connected to said solar energy absorbing structure at a location displaced from said axis, and said barrel has a blind end forming one of said chambers and an opposite end forming an opposite chamber surrounding said piston rod, and further comprising a hydraulic fluid reservoir and a hydraulic by-pass line connected to said reservoir and one hydraulic fluid transfer line leading to said opposite chamber in said cylinder barrel and further including means for allowing fluid flow from said hydraulic fluid reservoir through another hydraulic fluid transfer line to said gear motor when said gear motor is operated in one direction of rotation to supply fluid to said blind end of said hydraulic cylinder, and for preventing fluid flow to said reservoir from said gear motor when said gear motor is operated in said other direction of rotation to withdraw fluid from said blind end of said hydraulic cylinder, and further including means for allowing passage of hydraulic fluid through said bypass line when said gear motor is operated in said other direction of rotation and for preventing transfer of hydraulic fluid therethrough when said gear motor is operated in said one direction of rotation.

2. A solar energy absorbing structure according to claim 1 further characterized in that said means for controlling fluid flow to and from said bypass line is a solenoid actuated valve, and said means for allowing fluid flow from said reservoir to said gear motor when said gear motor is operated in said one direction of rotation is a check valve interposed therebetween.

* * * * *